(12) United States Patent
Zhang et al.

(10) Patent No.: US 10,305,370 B2
(45) Date of Patent: May 28, 2019

(54) ELIMINATION OF COMMUTATION FAILURE BY HYBRID HVDC SYSTEM

(71) Applicant: The University of Birmingham, Birmingham (GB)

(72) Inventors: Xiao-Ping Zhang, Birmingham (GB); Ying Xue, Birmingham (GB)

(73) Assignee: The University of Birmingham, Birmingham (GB)

( * ) Notice: Subject to any disclaimer, the term of this patent is extended or adjusted under 35 U.S.C. 154(b) by 0 days.

(21) Appl. No.: 15/571,715

(22) PCT Filed: Apr. 11, 2016

(86) PCT No.: PCT/GB2016/051008
§ 371 (c)(1),
(2) Date: Nov. 3, 2017

(87) PCT Pub. No.: WO2016/177991
PCT Pub. Date: Nov. 10, 2016

(65) Prior Publication Data
US 2018/0159421 A1 Jun. 7, 2018

(30) Foreign Application Priority Data
May 5, 2015 (GB) .................. 1507669.8

(51) Int. Cl.
*H02M 1/32* (2007.01)
*H02M 7/515* (2007.01)
(Continued)

(52) U.S. Cl.
CPC ........... *H02M 1/32* (2013.01); *H02M 1/4208* (2013.01); *H02M 7/519* (2013.01);
(Continued)

(58) Field of Classification Search
CPC ... H02M 7/4826; H02M 7/521; H02M 7/7575
(Continued)

(56) References Cited

U.S. PATENT DOCUMENTS

| 4,005,350 A | * | 1/1977 | Brenneisen | .......... | H02H 7/1225 |
| | | | | | 363/58 |
| 4,517,636 A | * | 5/1985 | Uchino | .................. | H02M 7/525 |
| | | | | | 363/138 |

(Continued)

FOREIGN PATENT DOCUMENTS

| CN | 103 986 177 A | 8/2014 |
| DE | 103 27 994 A1 | 1/2005 |

(Continued)

OTHER PUBLICATIONS

Great Britain Search Report (GB1507669.8); dated Nov. 23, 2015.
(Continued)

*Primary Examiner* — Gary A Nash
(74) *Attorney, Agent, or Firm* — Howard & Howard Attorneys PLLC (57) ABSTRACT

A line commutated converter, LCC, for a high-voltage, direct current, HVDC, power converter comprises at least one bridge circuit for connection to at least one terminal of a DC system. Each bridge circuit comprises a plurality of arms, and each arm is associated with a respective phase of an AC system. Each arm comprises an upper and lower thyristor connected in series, an associated branch extending from between the upper and lower thyristors, and at least one capacitor module for each phase. The, or each capacitor module is operable to insert a capacitor into the respective arm of the bridge circuit.

27 Claims, 8 Drawing Sheets

(51) Int. Cl.
*H02M 7/521* (2006.01)
*H02M 7/525* (2006.01)
*H02M 7/757* (2006.01)
*H02M 1/42* (2007.01)
*H02M 7/519* (2006.01)
*H02M 7/48* (2007.01)

(52) U.S. Cl.
CPC ......... *H02M 7/5155* (2013.01); *H02M 7/521* (2013.01); *H02M 7/525* (2013.01); *H02M 7/7575* (2013.01); *H02M 7/4826* (2013.01); *Y02E 60/60* (2013.01)

(58) Field of Classification Search
USPC .................. 363/34, 35, 37, 57, 58, 137, 138
See application file for complete search history.

(56) References Cited

U.S. PATENT DOCUMENTS

| | | | |
|---|---|---|---|
| 4,555,750 A | 11/1985 | Matsumura et al. | |
| 4,847,747 A * | 7/1989 | Abbondanti | H02M 7/5152 363/138 |
| 5,523,937 A * | 6/1996 | Kahkipuro | H02M 7/4826 363/136 |
| 5,673,189 A | 9/1997 | Schettler | |
| 5,949,664 A * | 9/1999 | Bernet | H02M 1/34 363/34 |
| 6,219,265 B1 * | 4/2001 | Bernet | H02M 7/487 363/137 |
| 2002/0060916 A1 * | 5/2002 | Weber | H02M 7/515 363/58 |
| 2007/0133235 A1 * | 6/2007 | Kurosawa | H02J 3/1807 363/50 |
| 2011/0094020 A1 | 4/2011 | Brookman | |
| 2011/0121661 A1 | 5/2011 | Kawakami et al. | |
| 2011/0310641 A1 | 12/2011 | Asplund et al. | |
| 2012/0174296 A1 | 7/2012 | Martin | |
| 2012/0250371 A1 * | 10/2012 | Fischer De Toledo | H02J 3/16 363/35 |
| 2013/0016541 A1 * | 1/2013 | Norrga | H02J 3/36 363/52 |
| 2014/0226373 A1 | 8/2014 | Park et al. | |

FOREIGN PATENT DOCUMENTS

| | | |
|---|---|---|
| DE | 10 2013 218207 A1 | 3/2015 |
| EP | 0 152 595 A1 | 8/1985 |
| EP | 0 982 843 A2 | 3/2000 |
| EP | 2 755 317 A1 | 7/2014 |
| EP | 2 773 032 A1 | 9/2014 |
| EP | 2975752 A1 | 1/2016 |
| WO | 2014/082657 A1 | 6/2014 |
| WO | 2014/141441 A1 | 9/2014 |

OTHER PUBLICATIONS

Updated International Search Report and Written Opinion (PCT/GB2016/052173); dated Sep. 29, 2016.
International Preliminary Report on Patentability (PCT/GB2016/051008); dated Nov. 7, 2017.
International Search Report (PCT/GB2016/051008); dated Jul. 28, 2016.
Written Opinion (PCT/GB2016/051008); dated Jul. 28, 2016.
European Office Action (EP App. No. 16 716 662.8); dated Jun. 20, 2018.

* cited by examiner

ELIMINATION OF COMMUTATION FAILURE BY HYBRID HVDC SYSTEM

CROSS-REFERENCE TO RELATED APPLICATION(S)

The present application is the National Stage of International Patent Application No. PCT/GB2016/051008, filed on Apr. 11, 2016, which claims priority to United Kingdom Patent Application No. 1507669.8, filed on May 5, 2015, both disclosures of which are hereby expressly incorporated herein by reference in their entirety.

FIELD OF THE INVENTION

The present invention relates to power converters, and more particularly to line commutated converters (LCC) for use in high-voltage, Direct Current (HVDC) systems, and the control of faults therein.

BACKGROUND

In a high-voltage, direct current (HVDC) electric power transmission system, direct current (DC) is used for the bulk transmission of electrical power. DC is often preferred for transmitting electric power over long distances, as electrical losses are lower than in corresponding AC transmission systems. In addition to this, DC transmission line costs over long distances are lower. This is because DC requires smaller conductor area than AC, as there is no need to support three phases and there is no skin effect.

In HVDC, high voltage AC must be converted to high voltage DC (rectification) before transmission, and high voltage DC must be reconverted to AC afterwards (inversion). Typically, line commutated converters (LCC) or voltage source converters (VSC) are used for rectification and inversion. LCC systems are often preferred to VSC systems, as larger power can be transmitted using LCC. The maximum power of a VSC system is limited by the power handling capability of power electronic devices. Some examples of power electronic devices include IGBTs (Insulated Gate Bipolar Transistors), IGCTs (Integrated Gate-Commutated Thyristors), GTOs (Gate Turn-off Thyristors), MOSFETs (Metal-Oxide-Semiconductor Field-Effect Transistors). Recently, LCC systems have been used to transmit up to 11 GW of electric power.

However, VSC systems typically employ transistors which can be switched on and off, while LCCs employ thyristors (more precisely thyristor valves) which can only be switched on. A thyristor begins conducting when it is forward biased and its gate terminal receives a current trigger, and will continue to conduct until it is no longer forward biased. Because of this, LCC systems are susceptible to commutation failure during faults on the AC side. As will be understood by the skilled reader, commutation is the process of switching conduction of the DC current from a conductor associated with one AC phase to a conductor associated with another AC phase. Commutation failure can mean that even after the fault has been cleared, the system may need to be shut down and restarted, potentially leading to blackout.

In addition to this, in LCC systems, because of the time at which the commutation starts and the duration of the commutation, the current in the converter lags the voltage, and the system consumes reactive power. This is different from VSC, which can produce or consume reactive power on demand.

The present invention has been devised with the foregoing in mind.

SUMMARY

According to a first aspect of the present invention, there is provided a line commutated converter, LCC, for a high-voltage, direct current, HVDC, power converter. The LCC comprises at least one bridge circuit for connection to at least one terminal of a DC system. Each bridge circuit comprises a plurality of arms, and each arm is associated with a respective phase of an AC system. Each arm comprises an upper and lower thyristor connected in series, an associated branch extending from between the upper and lower thyristors, and at least one capacitor module for each phase. The, or each capacitor module is operable to insert a capacitor into the respective arm of the bridge circuit.

It is an advantage that this invention leads to complete elimination of commutation failure under single-phase-to-ground and three-phase-to-ground faults. The length of time taken for commutation is also reduced.

In an embodiment, the capacitor modules are operable to insert a first capacitor into the bridge circuit during a first commutation period. In the first commutation period, commutation is provided from a first initially conducting thyristor in a first initially conducting arm to a first subsequently conducting thyristor in a first subsequently conducting arm.

In an embodiment, the capacitor modules are operable to insert the first capacitor into the first initially conducting arm to increase an effective commutation voltage. This reduces a current flowing through the first initially conducting thyristor, and charges the capacitor.

In an embodiment, the capacitor modules are operable to insert the first capacitor into the bridge circuit during a second commutation period. In the second commutation period, commutation is provided from a second initially conducting thyristor in a second initially conducting arm to a second subsequently conducting thyristor in a second subsequently conducting arm.

In an embodiment, the capacitor modules are operable to insert the charged first capacitor into the second subsequently conducting arm to increase the effective commutation voltage. This increases a current flowing through the second subsequently conducting thyristor, and discharges the first capacitor.

In an embodiment, in a "push method", the first initially conducting thyristor and first subsequently conducting thyristor are upper thyristors, and the second initially conducting thyristor and second subsequently conducting thyristor are lower thyristors.

In an embodiment, in a "pull method", the first initially conducting thyristor and first subsequently conducting thyristor are lower thyristors, and the second initially conducting thyristor and second subsequently conducting thyristor are upper thyristors.

An advantage associated with both the "push method" and the "pull method" is that the capacitor can charge and discharge during the commutation cycle. This means that the capacitor voltage is approximately balanced.

In an embodiment, in a "push & pull method", during the first commutation period, the capacitor modules are operable to insert a second capacitor into the first subsequently conducting arm to increase the effective commutation voltage. This increases a current flowing through the first subsequently conducting thyristor, and discharges the second capacitor.

An advantage of the "push & pull method" is that the insertion of two capacitors further increases the commutation voltage, and means that the voltage of the inserted capacitor of each module can be around half that of each inserted capacitor in either the "push method" or the "pull method", while achieving similar commutation performance.

In an embodiment, during the second commutation period, the capacitor modules are operable to insert a third capacitor into the second initially conducting arm to increase the effective commutation voltage. This reduces a current flowing through the second initially conducting thyristor and charges the third capacitor.

In an embodiment, the capacitor modules are operable to insert the first capacitor into the bridge circuit during a third commutation period. In the third commutation period, commutation is provided from a third initially conducting thyristor in a third initially conducting arm to a third subsequently conducting thyristor in a third subsequently conducting arm.

In an embodiment, the capacitor modules are operable to insert the first capacitor into the third initially conducting arm to increase the effective commutation voltage. This reduces a current flowing through the third initially conducting thyristor, and charges the capacitor.

In an embodiment, the capacitor modules are operable to insert the first capacitor into the bridge circuit during a fourth commutation period. In the fourth commutation period, commutation is provided from a fourth initially conducting thyristor in a fourth initially conducting arm to a fourth subsequently conducting thyristor in a fourth subsequently conducting arm.

In an embodiment, the capacitor modules are operable to insert the charged first capacitor into the fourth subsequently conducting arm to increase the effective commutation voltage. This increases a current flowing through the fourth subsequently conducting thyristor, and discharges the first capacitor.

In an embodiment, the first initially conducting thyristor, the first subsequently conducting thyristor, the fourth initially conducting thyristor, and fourth subsequently conducting thyristor are upper thyristors. The second initially conducting thyristor, second subsequently conducting thyristor, the third initially conducting thyristor and the third subsequently conducting thyristor are lower thyristors.

A further advantage of the push & pull method is that the same capacitor is inserted into an initially conducting arm and a subsequently conducting arm, for both an upper and a lower thyristor. This means that the capacitor charges and discharges to a similar degree over the commutation cycle, and the capacitor voltage is balanced.

A further advantage of the present invention is that independent fast reactive power control and tracking at the inverter side can be carried out by controlling the firing angle. Both positive and negative reactive power exchange with the AC network at inverter side can be implemented with the fast reactive power control and the proposed converter topology. This means that extinction angle can even be negative, which will export positive reactive power to the AC network. When extinction angle is positive, the inverter absorbs reactive power from the AC network. When extinction angle decreases, the reactive power, which the inverter absorbs from the AC network, decreases. This leads to cost savings, as there is a reduction in the required reactive power support at inverter side. Smaller converter transformer rating, lower converter losses and a lower number of thyristor levels in each valve can be achieved.

In an embodiment, each capacitor module is operable to insert a capacitor into a branch of the bridge circuit.

In an embodiment, each capacitor module is operable to insert a capacitor into an arm of the bridge circuit, above or below the associated branch.

Capacitor modules can be connected in series to form a multiple modular capacitor (MMC).

In an embodiment, at least one of the capacitor modules is a full bridge circuit.

In an embodiment, the, or each full bridge circuit is configured to insert a capacitor in either polarity into an arm.

An advantage of using the full bridge circuit is that the circuit is simple, and requires a small number of semiconductor components.

In an embodiment, at least one of the capacitor modules is a clamp-double circuit.

In an embodiment, the, or each clamp-double circuit is configured to insert two capacitors in either polarity into an arm.

An advantage of using the clamp-double circuit is that the circuit can have higher output voltages, or lower losses compared to a full bridge circuit with the same output voltage.

In an embodiment, at least one of the capacitor modules is a five-level cross connected circuit.

In an embodiment, the, or each five-level cross connected circuit is configured to insert one or two capacitors in either polarity into an arm.

An advantage of using the five-level cross connected circuit is that, as with the clamp-double circuit, the circuit can have higher output voltages, or lower losses compared to a full bridge circuit with the same output voltage. In addition to this, the five-level cross connected circuit has more switching states, which means that none, one or both of the capacitors may be inserted into the circuit, in either orientation In an embodiment, at least one of the capacitor modules is a mixed commutation circuit.

In an embodiment, the or each mixed commutation circuit is configured to selectively insert a first capacitor in a first polarity, the first capacitor and a second capacitor both in the first polarity, or the first capacitor in a second polarity.

An advantage of the mixed commutation circuit is that it has some of the functionality of two full-bridge circuits connected together, but has a smaller number of switching devices.

According to a second aspect of the present invention, there is provided a method of operating a line commutated converter, LCC, for a high-voltage, direct current, HVDC, converter. The method operates an LCC which comprises at least one bridge circuit for connection to at least one terminal of a DC system. Each bridge circuit comprises a plurality of arms, and each arm is associated with a respective phase of an AC system. Each arm comprises an upper and lower thyristor connected in series, an associated branch extending from between the upper and lower thyristors, and at least one capacitor module for each phase. The method comprises the step of inserting, by the, or each capacitor module, a capacitor into the respective arm of the bridge circuit.

In an embodiment, the capacitor modules insert a first capacitor into the bridge circuit during a first commutation period. In the first commutation period, commutation is provided from a first initially conducting thyristor in a first initially conducting arm to a first subsequently conducting thyristor in a first subsequently conducting arm.

In an embodiment, the capacitor modules insert the first capacitor into the first initially conducting arm to increase the effective commutation voltage. This reduces a current flowing through the first initially conducting thyristor, and charges the first capacitor.

In an embodiment, the capacitor modules insert a first capacitor into the bridge circuit during a second commutation period. During the second commutation period, commutation is provided from a second initially conducting thyristor in a second initially conducting arm to a second subsequently conducting thyristor in a second subsequently conducting arm.

In an embodiment, the capacitor modules insert the charged first capacitor into the second subsequently conducting arm to increase the effective commutation voltage. This increases a current flowing through the second subsequently conducting thyristor, and discharges the first capacitor.

In an embodiment, the method further includes controlling a firing angle, which is a phase angle between a point at which the effective commutation voltage becomes positive and a point at which a thyristor is fired. The firing angle is controlled by controlling timing of the firing of the thyristors. This allows an exchange of reactive power with the AC system to be controlled. An advantage of this is that both positive and negative reactive power exchange with the AC network at inverter side can be implemented. When extinction angle decreases, the reactive power, which the inverter absorbs from the AC network, decreases. This leads to cost savings, as there is a reduction in the required reactive power support at inverter side. Smaller converter transformer rating, lower converter losses and a lower number of thyristor levels in each valve can be achieved.

In an embodiment, the method further includes controlling timing of the firing of the thyristors of a converter operated as an inverter so as to provide a varying extinction angle for the inverter, thereby supplying a controllable reactive power to the AC system. The timing may be controlled such that the extinction angle is negative. The extinction angle is a phase angle between an end of a commutation period and a point at which the natural commutation voltage becomes negative. The natural commutation voltage is the commutation voltage in terms of what it would be without modification (without use of the capacitors).

In an embodiment, the method further comprises controlling timing of the firing of the thyristors of a converter operated as a rectifier to provide a varying firing angle for the rectifier, thereby supplying a controllable reactive power to the AC system. The timing may be controlled such that the firing angle is negative, thereby supplying a positive reactive power to the AC system.

Physically, the state of the inverter with a negative extinction angle is similar to that of the rectifier with a negative firing angle.

In embodiments, during a fault of the AC system, the effective commutation voltage prevents a commutation failure of the HVDC.

In embodiments wherein the LCC converter is used as a rectifier for converting from AC to DC, and as an inverter for converting from DC to AC, wherein during a fault of the AC system, the effective commutation voltage is controlled to provide a controllable reactive power support to the AC system, whereby the rectifier and inverter, respectively, supply a positive reactive power to the AC system, with a negative firing angle control for the rectifier and a negative extinction angle control for the inverter.

BRIEF DESCRIPTION OF THE DRAWINGS

FIG. 2b is a circuit diagram showing an embodiment of the present invention in which the "push method" of capacitor insertion is used, at a different point in the commutation cycle to FIG. 2a.

FIG. 3b is a circuit diagram showing an embodiment of the present invention in which the "pull method" of capacitor insertion is used, at a different point in the commutation cycle to FIG. 3a.

DETAILED DESCRIPTION

Figure 1:
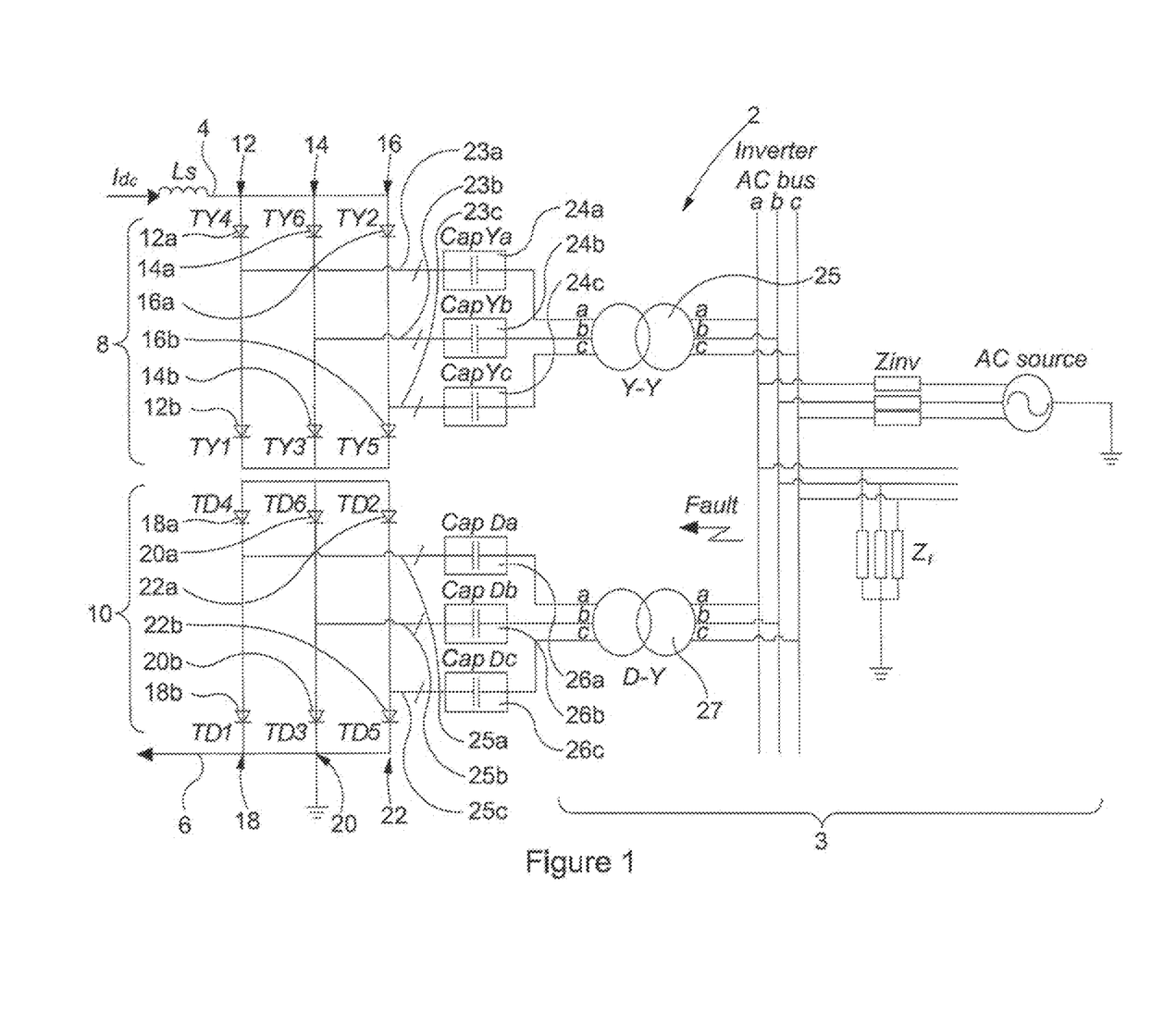
FIG. 1 is a circuit diagram showing a three-phase LCC inverter, according to an embodiment of the present invention.

Referring to FIG. 1, there is shown a three-phase LCC inverter 2, according to an embodiment of the present invention. The LCC inverter 2 converts power from DC to AC. Power comes from DC transmission lines (not shown), which connect to a first DC terminal 4 and a second DC terminal 6, and is delivered to a three-phase AC system 3. In the present invention, the first DC terminal 4 conducts currents into the inverter 2 while the second DC terminal 6 conducts current out of the inverter 2. The DC current remains approximately constant over time.

The inverter 2 has a 12-pulse arrangement, in which an upper 6-pulse bridge 8 and a lower 6-pulse bridge 10 are connected in series. The first DC terminal 4 connects to the upper 6-pulse bridge 8, while the lower 6-pulse bridge 10 connects to the second DC terminal 6. Although the invention is described here with respect to the 12-pulse bridge, it will be appreciated that this invention may be employed with other bridge circuits. For example, this invention could be employed in any 6 k-pulse bridge arrangement, where k=1, 2, 3, 4 . . . .

The upper 6-pulse bridge 8 includes three parallel arms 12, 14, 16 (one for each of the three phases of the AC system 3), each of which includes an upper thyristor 12a, 14a, 16a and a lower thyristor 12b, 14b, 16b, connected in series. The lower 6-pulse bridge 10 also includes three parallel arms 18, 20, 22 (one for each of the three phases of the AC system 3), each of which includes an upper thyristor 18a, 20a, 22a and a lower thyristor 18b, 20b, 22b, connected in series. All of the thyristors are connected with their polarity such that when they are switched on, they can conduct current from the DC system.

In each 6-pulse bridge 8, 10, each parallel arm 12, 14, 16, 18, 20, 22 includes a branch connection 23a-23c, 25a-25c to a respective one of the three phases of the AC system 3. Each branch connection 23a-23c, 25a-25c connects to a parallel arm 12, 14, 16, 18, 20, 22 at a point between the upper thyristor 12a, 14a, 16a and lower thyristor 12b, 14b, 16b of the parallel arm.

For the upper 6-pulse bridge 8, the branch connections 23a-23c connect to the AC system 3 via a wye-wye (star-star) transformer 25, while for the lower 6-pulse bridge 10, the branch connections 25a-25c connect to the AC system 3 via a delta-wye (delta-star) transformer 27.

In the present invention, each branch connection 23a-23c, 25a-25c includes a capacitor module 24a-24c, 26a-26c, which can insert a capacitor into the branch connection 23a-23c, 25a-25c. This is described in more detail below with reference to FIGS. 3 and 4.

The ideal operation of the inverter 2 is briefly described in the following paragraphs, with respect to the upper 6-pulse bridge 8. It will be appreciated that the lower 6-pulse bridge 10 operates in the same manner as the upper 6-pulse bridge 8. The effect of the capacitor modules 24a-24c, 26a-26c is not considered at this point.

In an ideal inverter, when commutation is not taking place, a first of the upper thyristors 12a, 14a, 16a conducts the DC current. At the same time, a first of the lower thyristors 12b, 14b, 16b, of a different parallel arm 12, 14, 16 to the conducting upper thyristor, also conducts the DC current. This means that the current flowing through two of the three phases is equal to DC current.

A short time later, a commutation period begins, where commutation is provided from an initially conducting thyristor in an initially conducting arm to a subsequently conducting thyristor in a subsequently conducting arm. This means that at the start of the commutation period, the next upper or lower thyristor is fired (receives a current trigger at its gate terminal) and begins to conduct. At this point, there is a voltage difference between the two commutating phases, which is known as the effective commutation voltage. In order for commutation to occur, the effective commutation voltage must be positive, such that the voltage of the subsequently conducting phase is greater than the voltage of the initially conducting phase for the lower thyristors, and the voltage of the subsequently conducting phase is smaller than the voltage of the initially conducting phase for the upper thyristors. This means that the current in the next upper or lower thyristor begins to increase, and the current in the corresponding (upper or lower) first thyristor begins to decrease. This continues until the current in the first thyristor falls below the thyristor's holding current, and the commutation period ends. For the system without capacitors, commutation is driven by the effective commutation voltage only.

The commutation period represents the short overlap period during which current passes through both the first and second thyristors. This is described in more detail below with reference to FIGS. 2a to 2c. The commutation period ends when the first thyristor switches off, and current passes through one of the upper thyristors 12a, 14a, 16a and one of the lower thyristors 12b, 14b, 16b only. The overlap angle, μ, is equal to the phase angle through which current passes through both the first and second thyristors.

The conventional system may be controlled by controlling a firing angle, α, which is the phase angle between the point in the cycle at which the effective commutation voltage becomes positive, and the point at which the thyristor is fired. Firing angle is controlled by controlling the timing of the firing of the thyristors.

It is common to refer to an extinction angle, γ, which is the phase angle between the end of the commutation period, and the point in the cycle at which the effective commutation voltage becomes negative. The extinction angle may also be defined by the relationship given below.

γ=180°−α where γ is the extinction angle, μ is the overlapping angle and a is the firing angle.

The above switching procedure continues and the thyristors are switched in a repeating sequence such that three-phase AC is produced in the AC system 3.

In the following discussion capacitors are used to modify (e.g. increase) the effective commutation voltage at various parts of the commutation cycle. It may be assumed that the effective commutation voltage is equal to a natural commutation voltage plus the voltages of the inserted capacitors. Therefore, herein where it is necessary to refer to the effective commutation voltage in terms of what it would be without such a modification (without use of the capacitors), such as in relation to the definition of firing angle or extinction angle, then this will be referred to as the natural commutation voltage.

The operation of the inverter 2 may be interrupted by an AC fault. In an AC fault, one or more of the AC phases may be short circuited to ground. When the thyristor which corresponds to a short-circuited AC phase is fired, a large current flows through the thyristor. This current remains at a value greater than the thyristor's holding current, even after the next thyristor is fired. This means that a thyristor doesn't switch off, and results in commutation failure of the system. As a result of commutation failure, the system often needs to be restarted. The present invention uses the capacitor modules 24a-24c, 26a-26c, illustrated above with reference to FIG. 1, to eliminate this commutation failure.

FIGS. 2a to 4 show a portion of the inverter circuit 2 (see FIG. 1) during commutation periods in which two thyristors conduct simultaneously. Again, FIGS. 2a to 4 show only the upper 6-pulse bridge 8. However, it will be appreciated that the operation of the lower 6-pulse bridge 10 is the same as that of the upper 6-pulse bridge 8. Examples of capacitor modules 24a-24c, 26a-26c used to insert capacitors into the commutating circuit loop are given below with reference to FIGS. 6a to 6c and 7a to 7c.

Figure 2A:
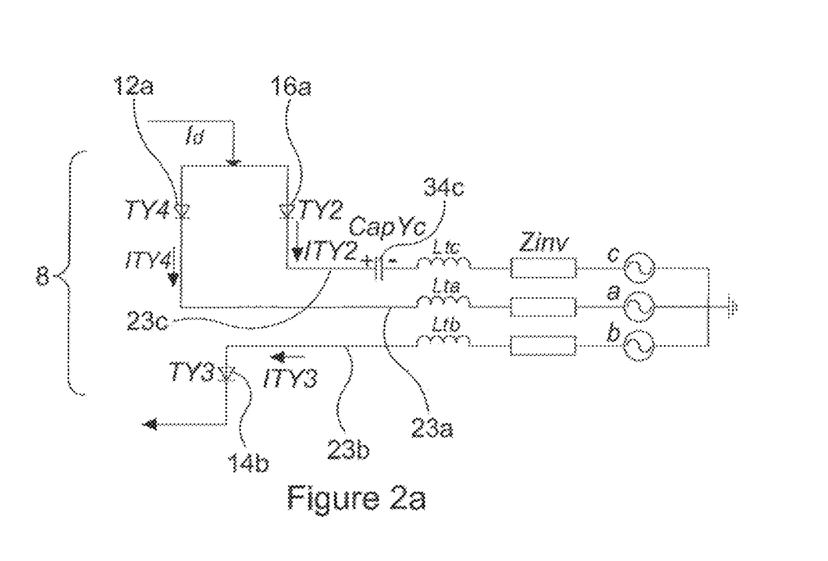
FIG. 2a is a circuit diagram showing an embodiment of the present invention in which the "push method" of capacitor insertion is used.
Figure 2B:
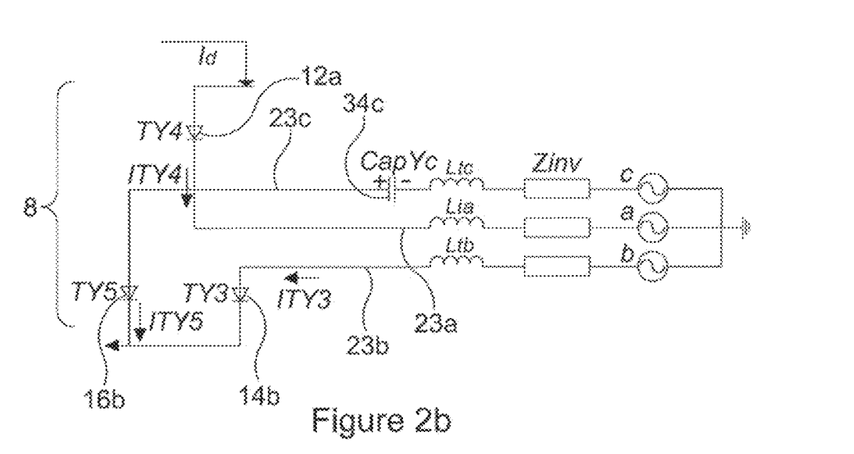
Figure 3A:
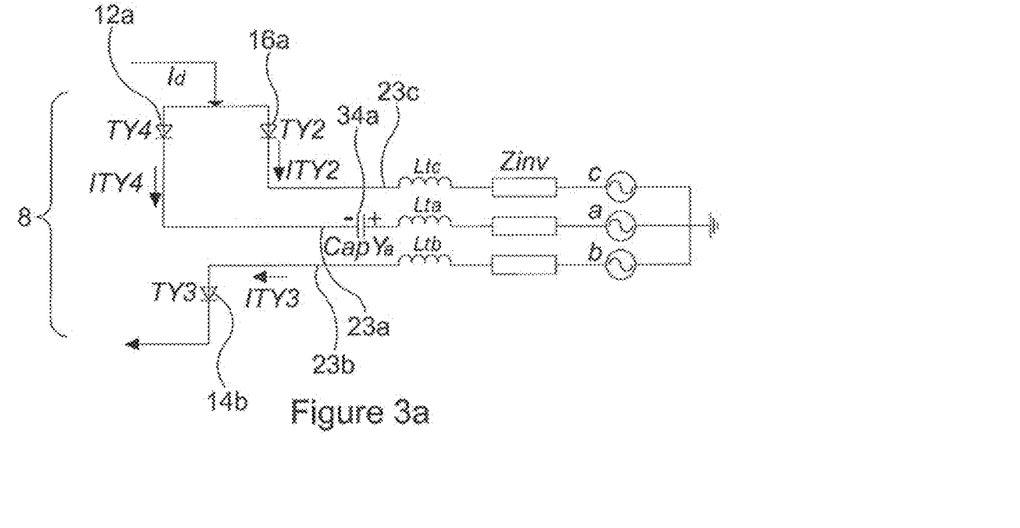
FIG. 3a is a circuit diagram showing an embodiment of the present invention in which the "pull method" of capacitor insertion is used.
Figure 3B:
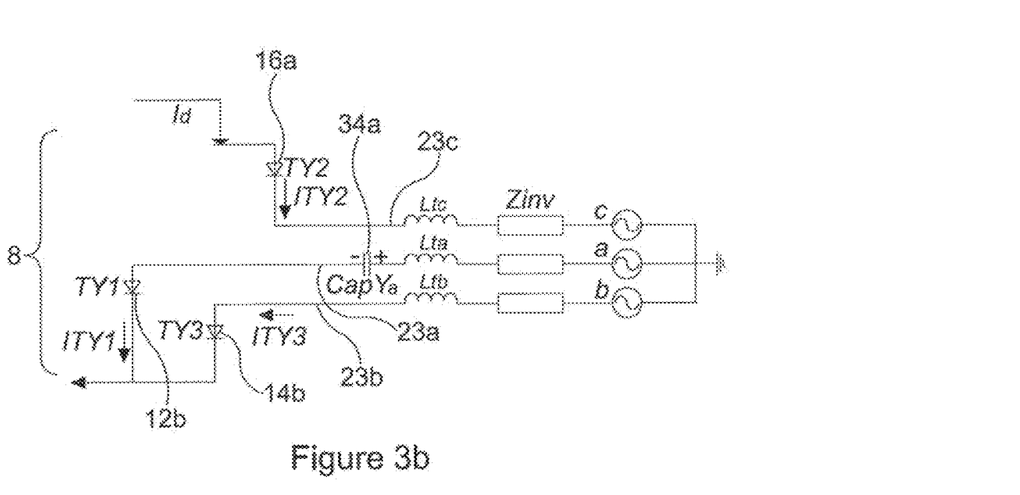
Figure 4:
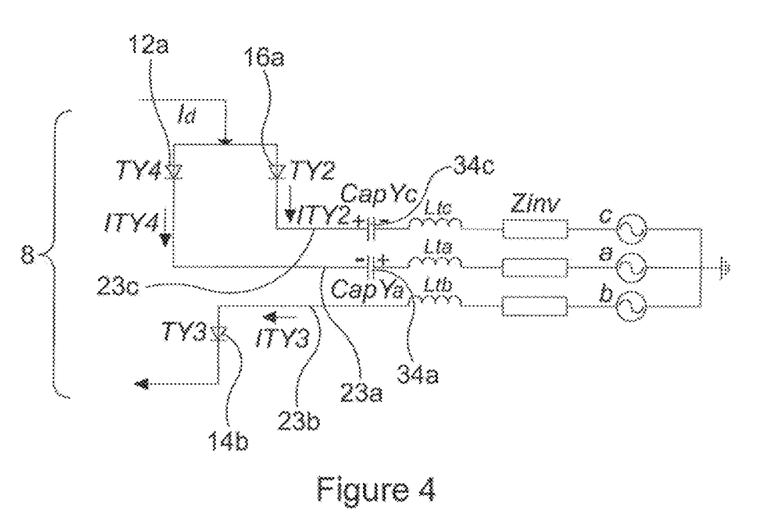
FIG. 4 is a circuit diagram showing an embodiment of the present invention in which the "push & pull method" of capacitor insertion is used.

The point in the cycle which is illustrated by FIGS. 2a, 3a and 4 represents the beginning of the commutation period from thyristor TY2 16a to thyristor TY4 12a. At this point, TY4 12a has just been fired. This means that TY2 16a will continue to conduct until its current drops to a value less than the thyristor's holding current. FIGS. 2b and 3b illustrate different points in the commutation cycle to FIGS. 2a, 3a and 4, as is explained below.

In all of the cases described below with respect to FIGS. 2a to 4, the insertion of capacitors acts, along with the voltage difference between the two commutating phases, to effect the commutation, by increasing the effective commutation voltage. As well as minimising the effect of an AC fault, the insertion of capacitors reduces the time taken for the completion of a commutation period. While none of the figures illustrate an AC fault, it will be appreciated that the methods of capacitor insertion eliminate commutation failure during a fault event.

Referring to FIG. 2a, there is shown an embodiment of the present invention in which the "push method" of capacitor insertion is used. In this embodiment, at the instant that TY4 12a is switched on via its gate terminal, a capacitor, CapYc 34c, is inserted into the phase c branch 23c, such that its positive plate is connected to TY2 16a. CapYc 34c causes the current through TY2 16a to decrease, and "pushes" the current to TY4. CapYc 34c charges during this commutation period. This continues until the current through TY2 16a reaches a value less than the thyristor holding current, and TY2 16a switches off.

Referring to FIG. 2b, there is shown an embodiment of the present invention in which a "push method" of capacitor insertion is used, at a different point in the commutation cycle to FIG. 2a. In FIG. 2b, TY3 14b is conducting and TY5 16b has just been fired. At this time, the charged CapYc 34c is again inserted into the phase c branch 23c in the same orientation as in FIG. 2a. CapYc 34c causes the current through TY5 16b to increase, and hence causes a reduction in the current through TY3 14b. This continues until the current through TY3 14b reaches a value less than the thyristor holding current, and TY3 14b switches off. CapYc 34c discharges during this commutation period.

The "push method" is carried out at two other points in time in the commutation cycle (not shown), by inserting the capacitor CapYa into the phase a branch 23a to decrease the current through thyristor TY4 12a or to increase the current through thyristor TY1 12b. The method is also carried out at two other points in time in the commutation cycle (not shown) by inserting CapYb into the phase b branch 23b, to decrease the current through thyristor TY6 14a and to increase the current through thyristor TY3 14b.

Over all of the commutation periods, each of the capacitors experiences current in both directions. This means that the capacitors charge and discharge to a similar degree, and the capacitor voltage is approximately balanced, when implementing the "push method".

Referring to FIG. 3a, there is shown an embodiment of the present invention in which a "pull method" of capacitor insertion is used. In this embodiment, at the instant that TY4 12a is fired, a charged capacitor, CapYa 34a, is inserted into the phase a branch 23a, such that its negative plate is connected to TY4 12a. CapYa 34a "pulls" the current to TY4 12a, increasing the current through TY4 12a, and thereby decreasing the current through TY2. This continues until the current through TY2 16a reaches a value less than the thyristor holding current, and TY2 16a switches off. CapYa 34a discharges during this commutation process, providing current to the AC system 3.

Referring to FIG. 3b, there is shown an embodiment of the present invention in which the "pull method" of capacitor insertion is used, at a different point in the commutation cycle to FIG. 3a. In FIG. 3b, TY1 12b is conducting and TY3 14b is fired. At this time, CapYa 34a is inserted into the phase a branch 23a in the same orientation as in FIG. 2b. CapYa 34a causes the current through TY1 12b to decrease. This continues until the current through TY1 12b reaches a value less than the thyristor holding current and TY1 12b switches off. CapYa 34a charges during this commutation period.

The "pull method" is carried out at two other points in time in the commutation cycle (not shown) by inserting capacitor CapYb into the phase b branch 23b, to increase the current through thyristor TY6 14a or to decrease the current through thyristor TY3 14b. The method is also carried out at two other points in time in the commutation cycle by inserting CapYc 34c into the phase c branch 23c, to increase the current through thyristor TY2 16a or to increase the current through thyristor TY5 16b.

Over all of the commutation periods, each of the capacitors experiences current in both directions. This means that the capacitors charge and discharge to a similar degree, and the capacitor voltage is approximately balanced, when implementing the "pull method".

Referring to FIG. 4, there is shown an embodiment of the present invention in which a "push & pull method" is used. In this embodiment, at the instant that TY4 12a is fired, CapYc 34c, is inserted into the phase c branch 23c, such that its positive plate is connected to TY2 16a. At the same time, CapYa 34b is inserted into the phase a branch 23a, such that its negative plate is connected to TY4 12a. This insertion increases the effective commutation voltage between phase c and phase a by the sum of the two capacitor voltages. This helps to significantly reduce the current through TY2 16a, until the current reaches a value less than the thyristor holding current, and TY2 16a switches off. During this process, CapYc 34c charges and CapYa 34a discharges.

In the "push & pull method", at other points in the cycle, CapYa 34a, CapYb and CapYc 34c are inserted into the branches as is described above for both the "push method" and the "pull method".

An advantage of the "push & pull method" is that over all of the commutation periods, each of the capacitors experiences current in both directions when inserted adjacent to one of the upper thyristors 12a, 14a, 16a. In addition to this, each of the capacitors experiences current in both directions when inserted adjacent to one of the lower thyristors 12b, 14b, 16b. As the DC current is approximately constant, the capacitors charge and discharge to the same degree over the cycle. This means that, for the "push & pull method", the system is balanced.

While the "push method" and "pull method" described above provide useful illustrations of the operation of the system, it will be appreciated that there is a large degree of similarity between the two methods. In both cases, capacitor modules insert a capacitor into the circuit during a commutation period. In addition to this, the two methods are similar as is described below.

In the "push method" with respect to the upper thyristors (as shown in FIG. 2a) and the "pull method" with respect to the lower thyristors (as shown in FIG. 3b), the capacitor modules insert capacitors in an initially conducting arm to increase an effective commutation voltage. This reduces the current flowing through the initially conducting thyristor, and charges the capacitor.

In the "push method" with respect to the lower thyristors (as shown in FIG. 2b) and the "pull method" with respect to the upper thyristors (as shown in FIG. 3a), the capacitor modules insert capacitors in a subsequently conducting arm to increase the effective commutation voltage. This increases the current flowing through the subsequently conducting thyristor, and the capacitor discharges.

Figure 5:
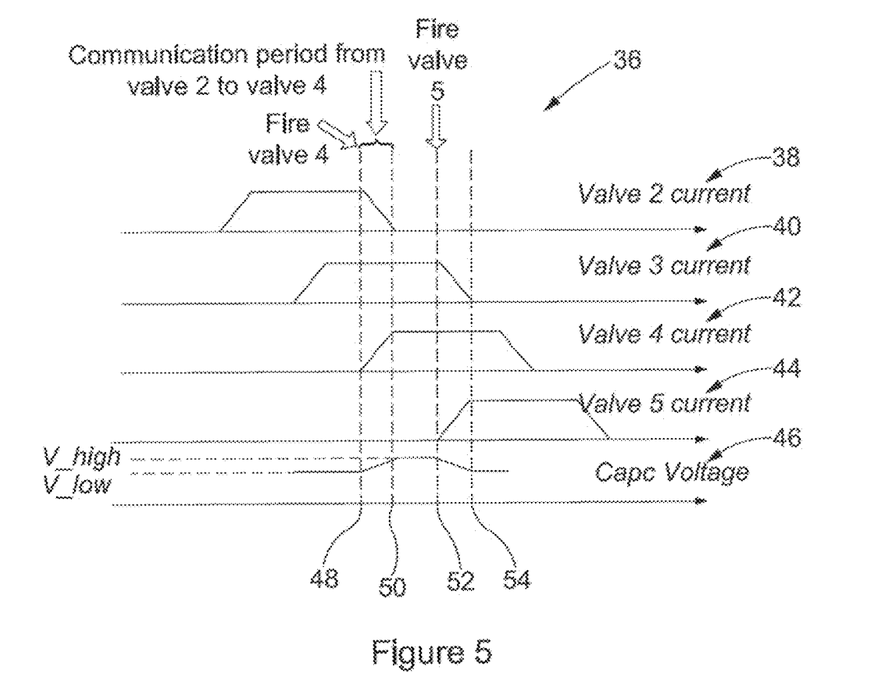
FIG. 5 shows plots of thyristor current and capacitor voltage against time.

Referring to FIG. 5, there are shown plots 36 of thyristor current against time for TY2 38, TY3 40, TY4 42 and TY5 44, as well as a plot of CapYc voltage against time 46. These plots represent either the "push method" or the "push & pull method", as described above with reference to FIG. 2a and FIG. 4.

At first time 48, the commutation period from TY2 to TY4 begins. This is as described above with reference to FIGS. 2a, 3a and 4. At second time 50, the commutation period from TY2 to TY4 ends. In between first time 48 and second time 50, CapYc is inserted into the phase c branch, such that its positive terminal is connected to TY2 (in order to "push" the current to TY4). CapYc is charged and its voltage increases from V_low to V_high. The current in TY2 decreases from the DC value to zero, while the current in TY4 increases from zero to the DC value.

At third time 52, the commutation period from TY3 to TY5 begins, while at fourth time 54, the commutation period from TY3 to TY5 ends. In between the third time 52 and the fourth time 54, CapYc is inserted into the phase c branch, in the same orientation as described in the previous paragraph. However, at this point, the current in the phase c branch is in the opposite direction, and CapYc discharges. This causes the voltage across CapYc to return from V_high to V_low. The current in TY3 decreases from the DC value to zero, while the current in TY5 increases from zero to the DC value.

In conventional LCC systems (without the capacitor insertion described above) the extinction angle, which is related to the turn-off time of the thyristors (and is defined above), cannot be too small, to ensure that a commutation margin is preserved for possible disturbances on the AC side. Extinction angle is primarily set by controlling the firing angle, which, in turn, is controlled by controlling the timing of the firing of the thyristors. In addition to this, extinction angle is affected by the overlap angle, as defined above.

With the method described here, commutation failure is eliminated and extinction angle can take a larger range of values. This means that firing angle can be controlled over a larger range of values, allowing the exchange of reactive power with the AC system to be favourably controlled. This leads to significant size reductions in reactive power support devices, smaller converter transformer rating, lower converter losses and a lower number of thyristor levels. Additionally, firing angle may be controlled such that the extinction angle for the converter when operated as an inverter (when DC power is converted to AC) is negative, thereby supplying reactive power to the AC system. Again, firing angle is controlled by controlling the timing of the firing of the thyristors. This ability to control the firing angle and/or extinction angle means that if there is a fault of the AC system, the effective commutation voltage can be controlled to supply reactive power to the AC system. This leads to a reduction in the required reactive power support, thereby allowing reduced sizes of AC filters, a smaller converter transformer rating, and lower converter losses.

In addition to the above, a smaller extinction angle means that for a given DC voltage level, AC voltage can be lower, and the thyristors can be rated for a lower voltage.

Figure 6A:
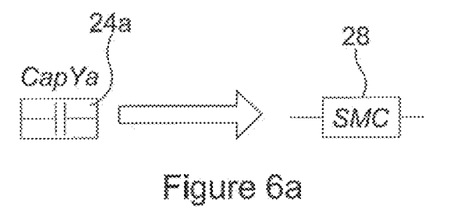
FIGS. 6a and 6b are schematic diagrams showing capacitor modules.
Figure 6B:
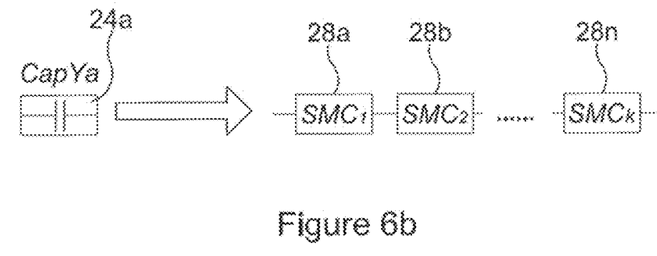

Referring to FIGS. 6a and 6b, there are shown schematic diagrams which show that capacitor module 24a may be a single modular capacitor (SMC) 28 or a series of connected SMCs 28a, 28b, . . . , 28n forming a Multiple Modular Capacitor (MMC). This is also true for the other capacitor modules 24b, 24c, 26a, 26b, 26c (see FIG. 1).

Figure 6C:
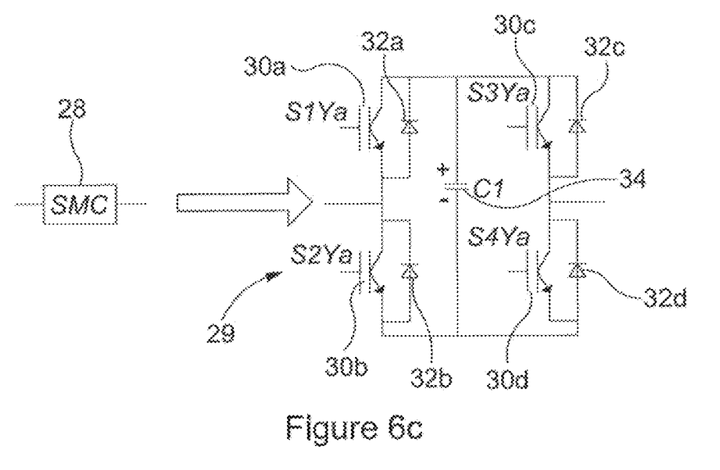
FIG. 6c is a circuit diagram for a full bridge circuit, which may be employed for the SMC module.

Referring to FIG. 6c, there is shown a circuit diagram for an SMC module 28, which allows the capacitor 34 to be inserted in either polarity into the branch connection 23a. In the present embodiment, the SMC 28 which makes up the capacitor module 24a is a full bridge circuit 29. The full bridge circuit 29 includes four insulated gate bipolar transistors (IGBTs) 30a, 30b, 30c, 30d, each equipped with an integral inverse parallel diode 32a, 32b, 32c, 32d. It will be appreciated that similar SMC modules may be used for capacitor modules 24b, 24c, 26a-26c, in branch connections 23b, 23c, 25a-25c.

Switching IGBTs 30b, 30c on and IGBTs 30a, 30d off results in the capacitor 34a being switched into the circuit in one orientation, while switching IGBTs 30a, 30d on and IGBTs 30b, 30c off results in capacitor 34a being switched into the circuit in the opposite orientation. Switching IGBTs 30a, 30c on and 30b, 30d off, or switching IGBTs 30b, 30d on and 30a, 30c off results in the capacitor 34a being bypassed.

An advantage of using the full bridge circuit 29 is that the circuit is simple, and requires a small number of semiconductor components.

Figure 7A:
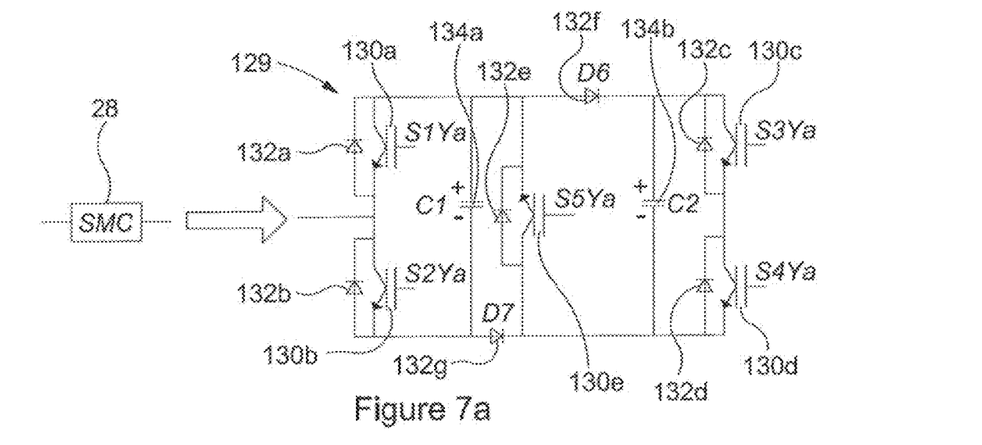
FIG. 7a is circuit diagram for a clamp-double circuit, which is an alternative circuit that may be employed for the SMC module.

Referring to FIG. 7a, there is shown a circuit diagram for a clamp-double circuit 129, which is an alternative circuit that may be employed for the SMC module 28. The clamp-double circuit 129 allows two capacitors 134a, 134b to be inserted in either polarity into one of the branch connections 23a-23c, 25a-25c. The clamp-double circuit 129 includes five IGBTs 130a-130e, each equipped with an integral inverse parallel diode 132a-132e, as well as two further diodes 132e, 132f.

Switching IGBTs 130b, 130c, 130e on and IGBTs 130a, 130d off results in the capacitors 134a, 134b being switched into the circuit in one orientation, while switching IGBTs 130a, 130d on and IGBTs 130b, 130c, 130e off results in the capacitors 134a, 134b being switched into the circuit in the opposite orientation. Switching IGBTs 130a, 130d, 130e on and IGBTs 130b, 130c off results in the capacitors 134a, 134b being bypassed.

An advantage of using the clamp-double circuit 129 is that the circuit can have higher output voltages, or lower losses compared to a full bridge circuit with the same output voltage. In addition to this, the clamp-double circuit 129 has the capability of blocking the fault current.

Figure 7B:
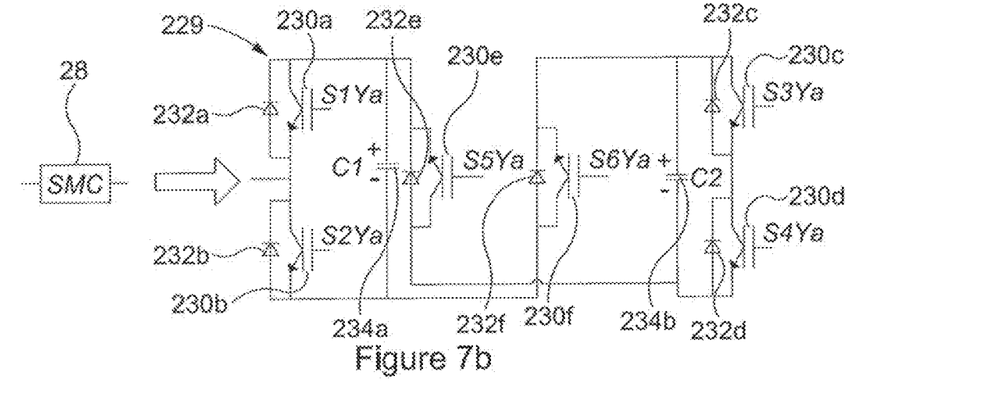
FIG. 7b is circuit diagram for a five-level cross connected circuit, which is an alternative circuit that may be employed for the SMC module.

Referring to FIG. 7b, there is shown a circuit diagram for a five-level cross connected circuit 229, which is an alternative circuit that may be employed for the SMC module 28. The five-level cross connected circuit 229 allows two capacitors 234a, 234b to be inserted in either polarity into one of the branch connections 23a-23c, 25a-25c. The five-level cross connected circuit includes six IGBTs 230a-230f, each equipped with an integral inverse parallel diode 232a-232f.

Switching IGBTs 230b, 230c, 230e on and IGBTs 230a, 230d, 230f off results in the capacitors 234a, 234b being switched into the circuit in one orientation, while switching IGBTs 230a, 230d, 230f on and IGBTs 230b, 230c, 230e off results in the capacitors 234a, 234b being switched into the circuit in the opposite orientation. Switching IGBTs 230a, 230d, 230e on and 230b, 230c, 230f off, or switching IGBTs 230b, 230c, 230f on and IGBTs 230a, 230d, 230e off results in the capacitors 234a, 234b being bypassed.

An advantage of using the five-level cross connected circuit 229 is that, as with the clamp-double circuit 129, the circuit can have higher output voltages, or lower losses compared to a full bridge circuit with the same output voltage. In addition to this, the five-level cross connected circuit 229 has more switching states, which means that none, one or both of the capacitors 234a, 234b may be inserted into the circuit, in either orientation.

Figure 7C:
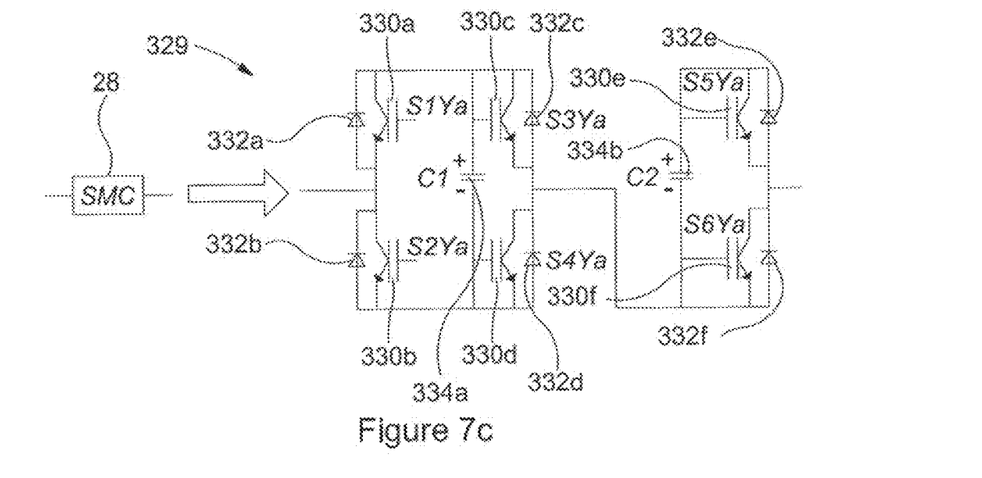
FIG. 7c is circuit diagram for a mixed commutation circuit, which is an alternative circuit that may be employed for the SMC module.

Referring to FIG. 7c, there is shown a circuit diagram for a mixed commutation circuit 329, which is another alternative circuit that may be employed for the SMC module 28. The mixed commutation circuit 329 allows a capacitor 334a to be inserted (in either polarity) and another capacitor 334b to be inserted (in a single polarity) into one of the branch connections 23a-23c, 25a-25c. The mixed commutation circuit 329 includes six IGBTs 330a-330f, each equipped with an integral inverse parallel diode 332a-332f.

Switching IGBTs 330b, 330c and 330e on and 330a, 330d, 330f off results in the capacitors 334a, 334b being switched into the circuit in one orientation, while switching IGBTs 330a, 330d, 330f on and 330b, 330c, 330e off results in capacitor 334a being switched into the circuit in the opposite direction. Switching IGBTs 330a, 330c, 330f on and IGBTs 330b, 330d, 330e off, or switching IGBTs 330b, 330d, 330f on and IGBTs 330a, 330c, 330e off results in the capacitor being bypassed.

An advantage of the mixed commutation circuit 329 is that it has some of the functionality of two full-bridge circuits connected together, but has a smaller number of switching devices.

It will be appreciated that there may be further alternative capacitor modules which may be used to insert capacitors into the circuit.

Figure 8:
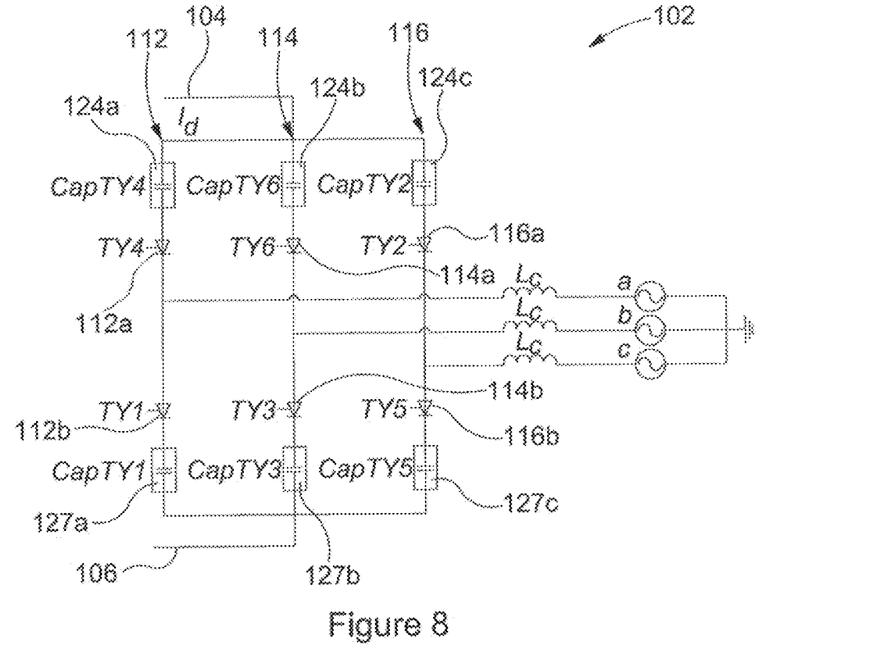
FIG. 8 is a circuit diagram of a portion of an alternative three-phase LCC inverter.

Referring to FIG. 8, there is shown an alternative arrangement for a portion of a three-phase LCC inverter 102. This arrangement is the same as that described above with respect to FIG. 1, but with two capacitor modules 112a, 112b, 114a, 114b, 116a, 116b connected in each of the three parallel arms 112, 114, 116.

LCC inverter 102 functions in the same manner as that described above with respect to FIG. 1, and results in the same circuits as those shown above with respect to FIGS. 2a to 4, during commutation. In order to ensure that the charging and discharging of the capacitors is balanced for LCC inverter 102, it is preferred that this arrangement is used to implement the push & pull method, as described above.

It will be appreciated that there are further alternative embodiments of the invention, in which the capacitor modules are connected in different locations. For example, in FIG. 8, the locations of the capacitor modules and thyristors may be swapped.

The above description uses a converter operated as an inverter shown in FIG. 1 as an example to explain the proposed control approach. However, the description and control principles are applicable to a converter operated as a rectifier. For the case of a rectifier, the timing of the firing of the thyristors can be controlled such that a varying firing angle for the rectifier can be achieved, thereby supplying a controllable reactive power to the AC system as specified and even the firing angle for the rectifier can be negative, thereby supplying a positive reactive power to the AC system (i.e. the thyristor is fired before the natural commutation voltage becomes positive).

Physically, the state of the inverter with a negative extinction angle is similar to that of the rectifier with a negative firing angle.

The invention claimed is:

1. A line commutated converter, LCC, for a high-voltage, direct current, HVDC, power converter, the LCC comprising at least one bridge circuit for connection to at least one terminal of a DC system, each bridge circuit comprising a plurality of arms, each associated with a respective phase of an AC system, each arm comprising:
    an upper and lower thyristor connected in series;
    an associated branch extending from between the upper and lower thyristors; and
    at least one capacitor module for each phase, the or each capacitor module operable to insert a capacitor into the respective arm of the bridge circuit in either polarity.

2. The LCC of claim 1, wherein the capacitor modules are operable to insert a first capacitor into the bridge circuit during a first commutation period, wherein commutation is provided from a first initially conducting thyristor in a first initially conducting arm to a first subsequently conducting thyristor in a first subsequently conducting arm.

3. The LCC of claim 2, wherein the capacitor modules are operable to insert the first capacitor into the first initially conducting arm to increase an effective commutation voltage, thereby reducing a current flowing through the first initially conducting thyristor and charging the capacitor.

4. The LCC of claim 1, wherein each capacitor module is operable to insert a capacitor into an arm of the bridge circuit, above or below the associated branch.

5. A line commutated converter, LCC, for a high-voltage, direct current, HVDC, power converter, the LCC comprising at least one bridge circuit for connection to at least one terminal of a DC system, each bridge circuit comprising a plurality of arms, each associated with a respective phase of an AC system, each arm comprising:
    an upper and lower thyristor connected in series;
    an associated branch extending from between the upper and lower thyristors;
    at least one capacitor module for each phase, the or each capacitor module operable to insert a capacitor into the respective arm of the bridge circuit;
    wherein the capacitor modules are operable to insert a first capacitor into the bridge circuit during a first commutation period, wherein commutation is provided from a first initially conducting thyristor in a first initially conducting arm to a first subsequently conducting thyristor in a first subsequently conducting arm;
    wherein the capacitor modules are operable to insert the first capacitor into the first initially conducting arm to increase an effective commutation voltage, thereby reducing a current flowing through the first initially conducting thyristor and charging the capacitor; and
    wherein the capacitor modules are operable to insert the first capacitor into the bridge circuit during a second commutation period, wherein commutation is provided from a second initially conducting thyristor in a second initially conducting arm to a second subsequently conducting thyristor in a second subsequently conducting arm.

6. The LCC of claim 5, wherein the capacitor modules are operable to insert the charged first capacitor into the second subsequently conducting arm to increase the effective commutation voltage, thereby increasing a current flowing through the second subsequently conducting thyristor and discharging the first capacitor.

7. The LCC of claim 6, wherein, in a "push method" the first initially conducting thyristor and first subsequently conducting thyristor are upper thyristors, and the second initially conducting thyristor and second subsequently conducting thyristor are lower thyristors.

8. The LCC of claim 6, wherein, in a "pull method" the first initially conducting thyristor and first subsequently conducting thyristor are lower thyristors, and the second initially conducting thyristor and second subsequently conducting thyristor are upper thyristors.

9. The LCC of claim 6, wherein, in a "push & pull method", during the first commutation period, the capacitor modules are operable to insert a second capacitor into the first subsequently conducting arm to increase the effective commutation voltage, thereby increasing a current flowing through the first subsequently conducting thyristor and discharging the second capacitor.

10. The LCC of claim 9, wherein during the second commutation period, the capacitor modules are operable to insert a third capacitor into the second initially conducting arm to increase the effective commutation voltage, thereby reducing a current flowing through the second initially conducting thyristor and charging the third capacitor.

11. The LCC of claim 10, wherein the capacitor modules are operable to insert the first capacitor into the bridge circuit during a third commutation period, wherein commutation is provided from a third initially conducting thyristor in a third initially conducting arm to a third subsequently conducting thyristor in a third subsequently conducting arm.

12. The LCC of claim 11, wherein the capacitor modules are operable to insert the first capacitor into the third initially conducting arm to increase the effective commutation voltage, thereby reducing a current flowing through the third initially conducting thyristor and charging the capacitor.

13. The LCC of claim 12, wherein the capacitor modules are operable to insert the first capacitor into the bridge circuit during a fourth commutation period, wherein commutation is provided from a fourth initially conducting thyristor in a fourth initially conducting arm to a fourth subsequently conducting thyristor in a fourth subsequently conducting arm.

14. The LCC of claim 13, wherein the capacitor modules are operable to insert the charged first capacitor into the fourth subsequently conducting arm to increase the effective commutation voltage, thereby increasing a current flowing through the fourth subsequently conducting thyristor and discharging the first capacitor.

15. The LCC of claim 14, wherein:
the first initially conducting thyristor, the first subsequently conducting thyristor, the fourth initially conducting thyristor, and fourth subsequently conducting thyristor are upper thyristors; and
the second initially conducting thyristor, second subsequently conducting thyristor, the third initially conducting thyristor and the third subsequently conducting thyristor are lower thyristors.

16. A method of operating a line commutated converter, LCC, for a high-voltage, direct current, HVDC, converter, wherein the LCC comprises at least one bridge circuit for connection to at least one terminal of a DC system, each bridge circuit comprising a plurality of arms, each associated with a respective phase of an AC system, each arm comprising:
an upper and lower thyristor connected in series;
an associated branch extending from between the upper and lower thyristors; and
at least one capacitor module for each phase, the method comprising:
inserting, by the or each capacitor module, a capacitor into the respective arm of the bridge circuit in either polarity.

17. The method of claim 16, wherein the capacitor modules insert a first capacitor into the bridge circuit during a first commutation period, wherein commutation is provided from a first initially conducting thyristor in a first initially conducting arm to a first subsequently conducting thyristor in a first subsequently conducting arm.

18. The method of claim 17, wherein the capacitor modules insert the first capacitor into the first initially conducting arm to increase an effective commutation voltage, thereby reducing a current flowing through the first initially conducting thyristor and charging the first capacitor.

19. A method of operating a line commutated converter, LCC, for a high-voltage, direct current, HVDC, converter, wherein the LCC comprises at least one bridge circuit for connection to at least one terminal of a DC system, each bridge circuit comprising a plurality of arms, each associated with a respective phase of an AC system, each arm comprising:
an upper and lower thyristor connected in series;
an associated branch extending from between the upper and lower thyristors; and
at least one capacitor module for each phase, the method comprising:
inserting, by the or each capacitor module, a capacitor into the respective arm of the bridge circuit;
wherein the capacitor modules insert a first capacitor into the bridge circuit during a first commutation period, wherein commutation is provided from a first initially conducting thyristor in a first initially conducting arm to a first subsequently conducting thyristor in a first subsequently conducting arm;
wherein the capacitor modules insert the first capacitor into the first initially conducting arm to increase an effective commutation voltage, thereby reducing a current flowing through the first initially conducting thyristor and charging the first capacitor; and
wherein the capacitor modules insert the first capacitor into the bridge circuit during a second commutation period, wherein commutation is provided from a second initially conducting thyristor in a second initially conducting arm to a second subsequently conducting thyristor in a second subsequently conducting arm.

20. The method of claim 19, wherein the capacitor modules insert the charged first capacitor into the second subsequently conducting arm to increase the effective commutation voltage, thereby increasing a current flowing through the second subsequently conducting thyristor and discharging the first capacitor.

21. The method of claim 19, further comprising controlling a firing angle, wherein:
the firing angle is a phase angle between a point at which the natural commutation voltage becomes positive and a point at which a thyristor is fired; and
the firing angle is controlled by controlling timing of the firing of the thyristors, thereby controlling an exchange of reactive power with the AC system.

22. The method of claim 21, further comprising controlling timing of the firing of the thyristors of the converter operated as an inverter, so as to provide a varying extinction angle for the inverter, thereby supplying a controllable reactive power to the AC system, wherein:
the extinction angle is a phase angle between an end of a commutation period and a point at which the natural commutation voltage becomes negative.

23. The method of claim 22, further comprising controlling timing of the firing of the thyristors such that the extinction angle is negative.

24. The method of claim 21, wherein the LCC converter is used as a rectifier for converting from AC to DC, the method further comprising controlling timing of the firing of the thyristors to provide a variable firing angle for the rectifier, thereby supplying reactive power to the AC system.

25. The method of claim 24, further comprising controlling timing of the firing of the thyristors such that the firing angle is negative thereby supplying a positive reactive power to the AC system.

26. The method of claim 19, wherein the LCC converter is used as a rectifier for converting from AC to DC, and as an inverter for converting from DC to AC, wherein during a fault of the AC system, the effective commutation voltage is controlled to provide a controllable reactive power support to the AC system, whereby the rectifier and inverter, respectively, supply a positive reactive power to the AC system, with a negative firing angle control for the rectifier and a negative extinction angle control for the inverter.

27. A line commutated converter, LCC, for a high-voltage, direct current, HVDC, power converter, the LCC configured as a rectifier for converting from AC to DC, and as an inverter for converting from DC to AC and comprising at least one bridge circuit for connection to at least one terminal of a DC system, each bridge circuit comprising a plurality of arms, each associated with a respective phase of an AC system, each arm comprising:

an upper and lower thyristor connected in series;

an associated branch extending from between the upper and lower thyristors; and     at least one capacitor module for each phase, the or each capacitor module operable to insert a capacitor into the respective arm of the bridge circuit, wherein the capacitor modules are operable to insert a capacitor into the bridge circuit during a commutation period, wherein commutation is provided from an initially conducting thyristor in an initially conducting arm to a subsequently conducting thyristor in a subsequently conducting arm, to increase an effective commutation voltage, and wherein during a fault of the AC system, the effective commutation voltage is controlled to provide a controllable reactive power support to the AC system, whereby the rectifier and inverter, respectively, supply a positive reactive power to the AC system, with a negative firing angle control for the rectifier and a negative extinction angle control for the inverter.

* * * * *